(12) United States Patent
Boehmer et al.

(10) Patent No.: US 7,116,381 B2
(45) Date of Patent: Oct. 3, 2006

(54) COLLOIDAL SOLUTION COMPRISING SILVER METAL PARTICLES AND A SILANE DERIVATIVE

(75) Inventors: Marcel Rene Boehmer, Singapore (SG); Martinus Petrus Joseph Peeters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 208 days.

(21) Appl. No.: 10/495,665

(22) PCT Filed: Oct. 24, 2002

(86) PCT No.: PCT/IB02/04461

§ 371 (c)(1), (2), (4) Date: May 12, 2004

(87) PCT Pub. No.: WO03/041897

PCT Pub. Date: May 22, 2003

(65) Prior Publication Data

US 2004/0251448 A1 Dec. 16, 2004

(30) Foreign Application Priority Data

Nov. 13, 2001 (EP) .................................. 01204334

(51) Int. Cl.
*G02F 1/13* (2006.01)
*H01B 1/12* (2006.01)
*B05D 5/12* (2006.01)
*B05D 3/02* (2006.01)

(52) U.S. Cl. .............................. 349/1; 252/500; 427/58; 427/372.2; 427/125

(58) Field of Classification Search ................ 252/500, 252/514, 519.3, 519.31; 106/1.19; 349/1; 427/58, 372.2, 125
See application file for complete search history.

(56) References Cited

U.S. PATENT DOCUMENTS 5,015,413 A * 5/1991 Nagaoka ...................... 252/511
5,764,324 A * 6/1998 Lu et al. ...................... 349/113
6,534,581 B1 * 3/2003 Kleyer et al. ................ 524/379

OTHER PUBLICATIONS

Tomonaga et al., "Photochromic coatings including silver halide microcrystals via sol-gel process," Thin Solid Films, 392 (2001).*
P. Innocenzi, "Methyltriethoxysilane derived coatings for optical applications," SPIE vol. 2288 Sol-Gel Optics III, pp. 87-95 (1994).*

* cited by examiner

*Primary Examiner*—Mark Kopec
*Assistant Examiner*—Jaison Thomas
(74) *Attorney, Agent, or Firm*—Kevin H. Fortin

(57) ABSTRACT

The invention pertains to a composition comprising silver metal particles and an additive, characterized in that the additive is a silane derivative comprising at least one methyl group and at least one alkoxy group. Preferably, the silane derivate is methyl trimethoxysilane, methyl triethoxysilane, or a mixture thereof. The compositions can be used to make thermal resistant conductive silver-containing layers, for instance for use in AMLCD.

6 Claims, 2 Drawing Sheets

COLLOIDAL SOLUTION COMPRISING SILVER METAL PARTICLES AND A SILANE DERIVATIVE

CROSS-REFERENCE TO RELATED APPLICATIONS

This application is a continuation of International Application PCT/TBO2/04461, filed Oct. 24, 2002, which claims priority from European Application 01204334.5, filed Nov. 13, 2001.

BACKGROUND OF THE INVENTION

The invention pertains to a composition comprising silver metal particles and an additive, to thermally resistant conductive layers, to an active matrix liquid crystalline display (AMLCD) comprising the said layers, and to the use of said composition in the manufacture of silver-containing layers in an article.

Compositions comprising silver particles with or without other constituents, are well known in the art. For instance, in EP 826,415 a method for preparing a silver sol has been disclosed. These silver sols are used for making a conductive film on a substrate. By spin-coating the sol onto a substrate, such films are made and these are then heated at 150° C.

In EP 276,459 a method for manufacturing cathode-ray tubes was disclosed. Antistatic silicon dioxide films were prepared that contained small amounts of (among others) silver. To a solution or a colloidal solution containing metal particles a cationic or anionic surfactant was added as an additive for improving the stability of the solution, after which an antistatic film was produced by a spraying, dispensing, or dipping method of this material onto a substrate, followed by heating at 200° C. for 15 min.

It was found that silver-containing layers, particularly layers that contain 80 vol. % or more silver, cannot be heated above 250° C., and preferably not above 200° C. without serious appearance of irreversible exfoliating and/or creep phenomena. Creep is a process wherein the film deteriorates into a plurality of small sections containing silver and section therein between containing no silver. On creep the surface roughens, which means that the mirror-like appearance of the silver-containing layer disappears. Silver-containing layers (or films) that have undergone exfoliation and/or creep no longer have a low resistivity, and because of the low conductivity have become unsuitable for most of the applications that require a resistivity of less than 6 μΩ.cm (microOhm.centimeter). Since silver-containing layers are usually made of compositions also comprising organic materials such as organic binder materials, and because only relatively low temperatures (less than 250° C., preferably less than 200° C.) can be used for making silver-containing layers with sufficient conductivity, such layers usually contain amounts of organic materials that are not sufficiently removed at those temperatures. Also in further processing steps high temperatures (higher than 250° C.) may be necessary. For instance, flitting a CRT-cone to a screen occurs at 450° C. To make it possible to use silver at such high temperatures, a polymeric binder and frit glass particles can be mixed into a silver paste. However, the presence of the glass particles reduces the conductivity considerably. Furthermore, since these added particles have sizes in the micron range, such mixed pastes are no longer suitable to make silver-containing layers thinner than 1 μm. Thin layers of well-conducting silver on an insulating surface, such as on Coming®1737 glass, which are used for active matrix liquid crystal displays (AMLCD), or on glass or any other substrate for use in infrared reflective stacks, can be made by using an electroless silver process, but the maximum temperature in the further reaction steps is limited to 250° C. At that temperature $Si_3N_4$ deposition takes place, and moreover, the electroless process is commercially not desired anyway since it is a slow non-equilibrium process with a short bath pot life.

There is a considerable need for a method of making thin conductive silver-containing layers that can be heated at temperatures higher than 250° C. without losing its conductivity and mirror-like appearance.

SUMMARY OF THE INVENTION

The invention pertains to a composition comprising silver metal particles and a silane derivative. The compositions can be used to make thermal resistant conductive silver-containing layers, for instance, for active matrix liquid crystalline displays.

DETAILED DESCRIPTION OF THE INVENTION

Figure 1:
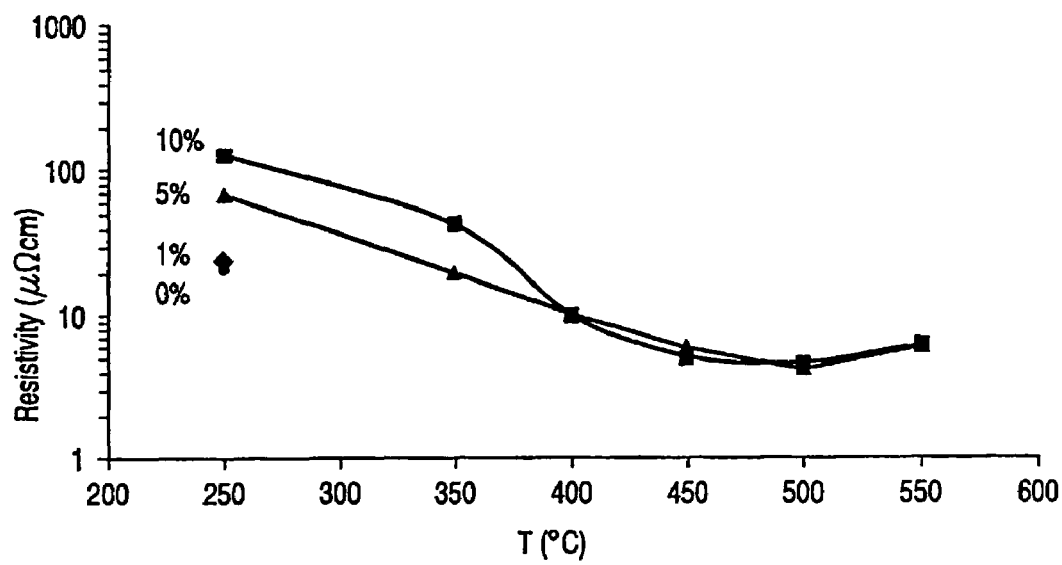
FIG. 1 shows the resistivity of spin-coated silver-containing layers as a function of curing temperature for colloidal silver/methyl trimethoxysilane at different volume fractions of methyl trimethoxysilane. according to an aspect of the instant invention.

It was now surprisingly found that compositions comprising silver metal particles and an additive, which is a silane derivative comprising at least one methyl group and at least one alkoxy group, are very stable and can be applied onto a substrate and heated to temperatures as high as 450° C., usually as high as 700° C., and in many instances even as high as 1000° C. It was further found that the resistivity of silver-containing layers of 200 nm thickness made of these compositions at these high temperatures remained as low as 2.5 to 6 μΩcm, which values are completely comparable with the resistivity of silver-containing layers that are obtained by electroless depositing silver at 250° C., which was found to be 3–4 μΩcm. A further advantage of the present invention is that the silver-containing layers show improved adherence to inorganic substrates such as glass.

Moreover, the silver-containing layers do not show aging, i.e. the mirror-like appearance of the silver-containing layer does not visually change and does not show increase of resistivity over a period of at least 1 year.

It was now surprisingly found that compositions comprising silver metal particles and an additive, which is a silane derivative comprising at least one methyl group and at least one alkoxy group, are very stable and can be applied onto a substrate and heated to temperatures as high as 450° C., usually as high as 700° C., and in many instances even as high as 1000° C. It was further found that the resistivity of silver-containing layers of 200 nm thickness made of these compositions at these high temperatures remained as low as 2.5 to 6 μΩcm, which values are completely comparable with the resistivity of silver-containing layers that are obtained by electroless depositing silver at 250° C., which was found to be 3–4 μΩcm. A further advantage of the present invention is that the silver-containing layers show improved adherence to inorganic substrates such as glass. Moreover, the silver-containing layers do not show ageing, i.e. the mirror-like appearance of the silver-containing layer does not visually change and does not show increase of resistivity over a period of at least 1 year.

These profitable properties make silver-containing films of the composition of the invention very suitable for application in AM LCD, passive integration, high temperature-resistant reflective layers (such as used in CRTs having a tracking structure instead of a shadowmask, also referred to as Fast Intelligent Tracking-FIT), and in reflective displays. Due to their enhanced stability on ageing, it is also advantageous to use these silver-containing laycrs in low temperature applications, such as its use for making mirrors for applications where ageing is a problem.

Preferably, the silane derivative is methyl trialkoxysilane, wherein the alkoxy moieties have 1 to 4 carbon atoms. Preferred alkoxy groups are methoxy and ethoxy groups. Most preferred silane derivative is methyl trimethoxysilane (MTMS), methyl triethoxysilane (MTES), or a mixture thereof. Preferably, the composition comprises <20 vol. % of the silane derivative, most preferably <10 vol. %. At concentrations higher than 20 vol. % the conductivity decreases as the result of the low silver content.

The most common composition of the invention is a colloidal silver sol comprising the silane derivative. These sols are very stable and have a long pot life. Application of these sols onto a substrate can simply be performed in the manners known in the art, for instance by a spin-coating or printing process.

The composition is usually brought onto a substrate, usually an inorganic substrate such as glass to form a thermal resistant conductive silver-containing layer. These layer can be used, i.a. in an active matrix liquid crystalline display.

In general the compositions are also very suitable for making silver-containing layers for use in a device wherein the silver-containing layer is exposed to a temperature of 200° C. or higher. When these silver-containing layers comprising the silane derivative additive are exposed to such temperatures the additive, disappears completely or partially from the silver-containing layer under decomposition to silicon dioxide and/or silsesquioxane, which decomposition products then form a layer adjacent to the silver-containing layer. The invention therefore also pertains to a thermal resistant conductive layer comprising a silver-containing layer and a layer comprising at least one of silicon dioxide and silsesquioxane. Such thermal conductive layers can be applied to an article, such as an AMLCD or in IR reflective stacks.

The invention also relates to a specularly reflecting silver layer obtainable by curing a layer formed of a composition in accordance with the invention. The advantages of such layers has been described hereinabove and will be elucidated further with reference to the examples described below.

The invention also relates to a substrate provided with a silver layer having a thickness less than 1 μm and capable of specularly reflecting incident light if exposed or after having been exposed to temperatures of 250° C. or more.

Using the compositions in accordance with the invention such silver layers can be made using conventional wet deposition methods such as spin-coating or printing methods such as ink jet printing.

The invention is illustrated by the following examples.

EXAMPLE 1

Colloidal silver (6 g, ex Merck) was added to 20 g of water and rolled for one night on a roller conveyer and the sol dispersion was filtered over a 200 nm filter. A composition containing 40 g methyl trimethoxysilane (MTMS)

0.86 g tetraethoxysilane (TES)

Figure 2:
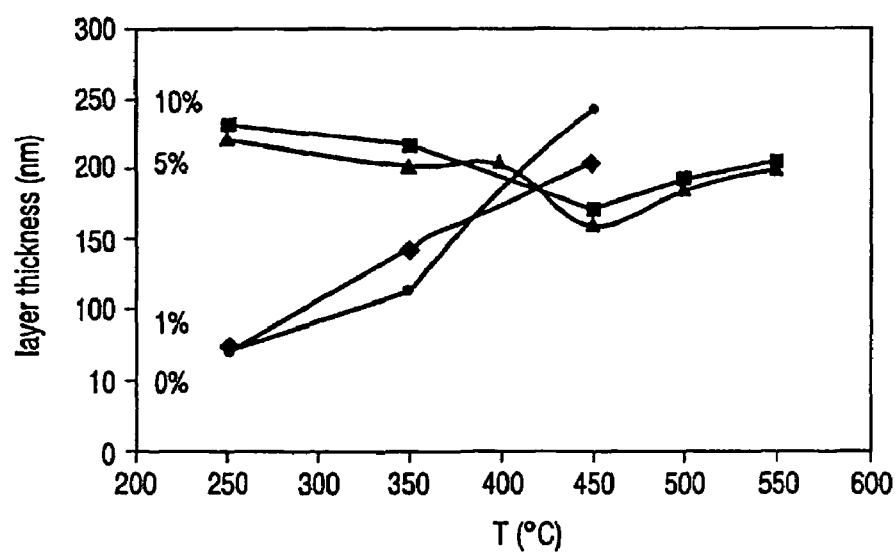
FIG. 2 shows the layer thickness of spin-coated silver-containing layers as a function of curing temperature for colloidal silver/methyl trimethoxysilane at different volume fractions of methyl trimethoxysilane, according to another aspect of the instant invention.

32 g water 4.5 g ethanol 0.14 g glacial acetic acid was hydrolyzed for 48 h. 0.09 g of this hydrolyzed mixture were added to 4 g of the above silver sol dispersion under continuous stirring, to give a silver-containing layer comprising 10 vol. % of MTMS (assuming a density of 2 g/ml for fully condensed MTMS). In a similar manner silver sols comprising 5%, 1%, and 0% of MTMS, respectively were prepared. Silver-containing layers were spin-coated onto 1% HF cleaned glass plates. The spin-coated glass plates were cured at 250° C. for 30 min, followed by a further heat treatment for 30 min at 350, 450, 500, and 550° C. The results obtained with these silver-containing layers with respect of resistivity and layer thickness are depicted in FIG. 1 and FIG. 2.

EXAMPLE 2

Figure 3:
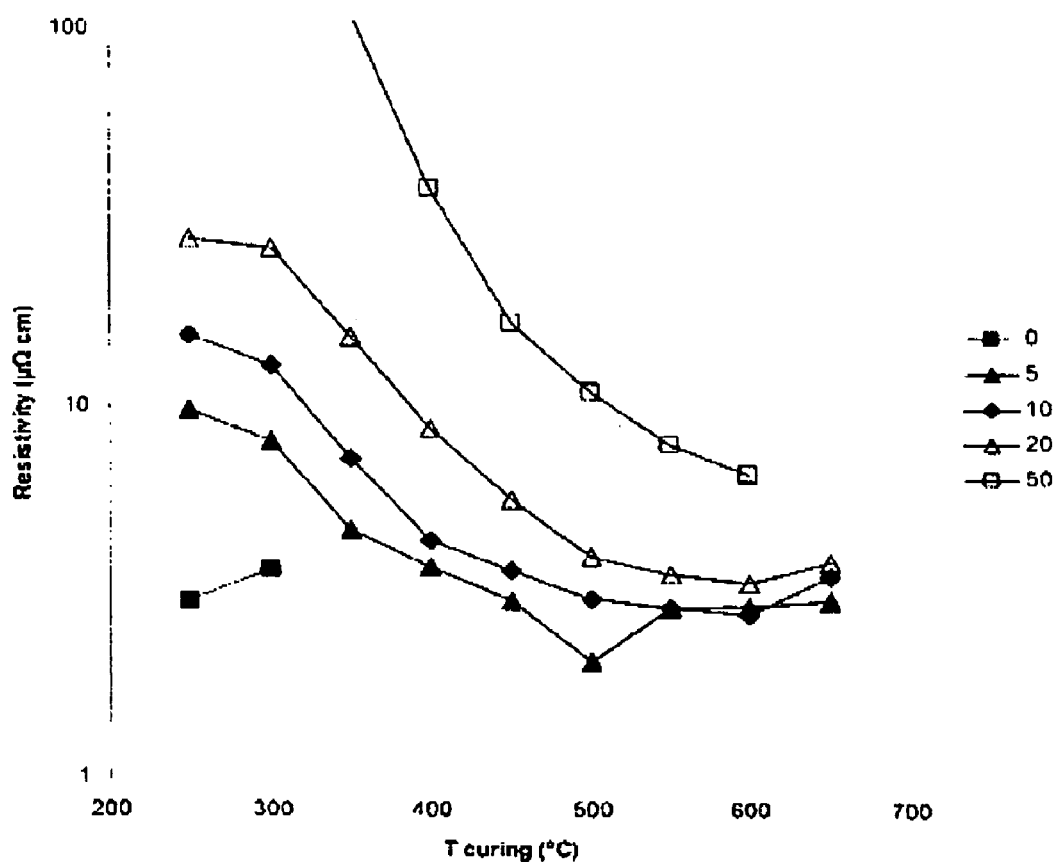
FIG. 3 shows the resistivity of spin-coated silver-containing layers as a function of curing temperature for colloidal silver/methyl trimcthoxysilane at different volume fractions of methyl trimethoxysilane, according to another aspect of the instant invention.

MTMS was added to a dispersion of silver colloids in water (ex Nippon Paint). The amount of MTMS leads to the formation of silver-containing layers with 0, 5, 10, 20, and 50 vol. % of $CH_3$—$SiO_{3/2}$ (assuming a density of 2 g./ml). The layers were deposited deposited onto a Coming 1737 substrate by spin-coating. After heating at a temperature within the range 200 to 700° C. (high heating rates), the resistivity was measured using a four-point probe. The results arc given in FIG. 3. Although good conductivity could be obtained after low temperature processing of the MTMS free (0 vol. %) sample, the adhesion of the silver to the substrate was found to be inferior.

Figure 4:
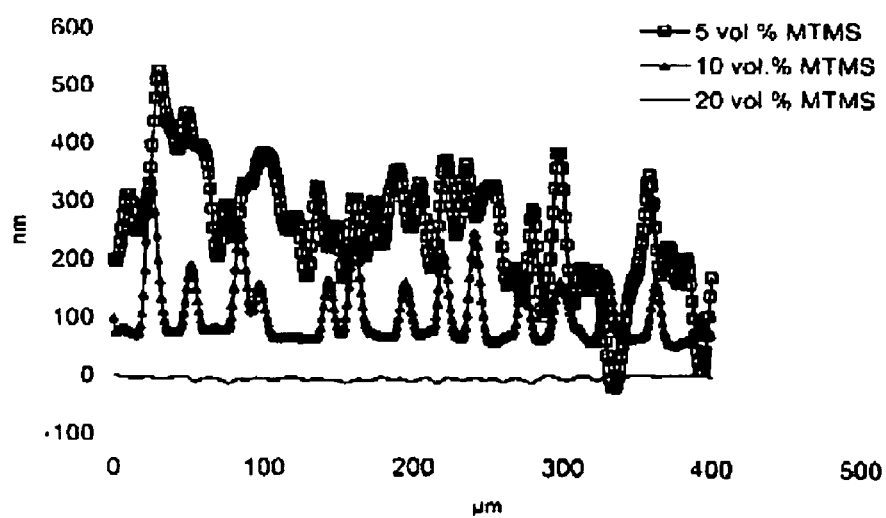
FIG. 4 shows the surface profile of spin-coated silver-containing layers, cured at 250° C. for 1 hour and subsequently heated to 500° C., for different volume fractions of methyl trimethoxysilane, according to another aspect of the instant invention.

The amount of MTMS added also influences the heating rate that can be applied. Samples were cured at 250° C. for 1 h, and subsequently heated to 500° C. (dwell time 1 h) at the indicated heating rates. The results are given in FIG. 4.

EXAMPLE 3

44.6 mg of MTMS were added to 10 ml of water and homogenized. To this solution 3 g of colloidal silver (ex Merck) were added and the mixture was stirred overnight with a roller bench. The solution was spin-coated onto a glass substrate, yielding silver-containing layers comprising 5 vol. % of MTMS.

EXAMPLE 4

58.4 mg of MTES (methyl triethoxysilane) were added to 10 ml of water and homogenized. To this solution 3 g of colloidal silver (ex Merck) were added and the mixture was stirred overnight with a roller bench. The solution was spin-coated onto a glass substrate, yielding silver-containing layers comprising 5 vol. % of MTES.

The invention claimed is:

1. An active matrix liquid crystalline display (AMLCD) comprising a silver containing layer adjacent to a silsesquioxane layer.

2. A method for making an active matrix liquid crystal display, comprising:
   a) providing a composition, wherein the composition comprises silver metal and a silane derivative, wherein the silane derivative is a methylalkoxysilane;
   b) applying the composition to a substrate; and
   c) heating the composition applied in said step b), wherein said heating the composition in said step c) results in the completion of the following steps i)–iii):
      i) forming a first layer on said substrate, said first layer comprising silver metal;
      ii) decomposing the silane derivative to form silsesquioxane; and
      iii) forming a second layer adjacent to the first layer, wherein the second layer comprises silsesquioxane, silicon dioxide, or a mixture thereof.

3. The method of claim 2, wherein the methylalkoxysilane is methyltrimethoxysilane, methyltriethoxysilane, or a mixture thereof.

4. The method of claim 2, wherein the composition provided in said step a) comprises <10 vol. % of the silane derivative.

5. The method of claim 2, wherein said step c) comprises heating the composition on the substrate at a temperature of 250° C. or more.

6. The method of claim 2, wherein the first layer is a specularly reflecting layer.

* * * * *